United States Patent
Palagummi

(10) Patent No.: US 9,489,266 B2
(45) Date of Patent: Nov. 8, 2016

(54) SYSTEM AND METHOD OF STORING BACKUP IMAGE CATALOG

(75) Inventor: Siva Sai Prasad Palagummi, Andhra Pradesh (IN)

(73) Assignee: GOOGLE INC., Mountain View, CA (US)

(*) Notice: Subject to any disclaimer, the term of this patent is extended or adjusted under 35 U.S.C. 154(b) by 361 days.

(21) Appl. No.: 12/636,179

(22) Filed: Dec. 11, 2009

(65) Prior Publication Data

US 2011/0145199 A1 Jun. 16, 2011

(51) Int. Cl.
*G06F 17/30* (2006.01)
*G06F 11/14* (2006.01)

(52) U.S. Cl.
CPC ....... *G06F 11/1435* (2013.01); *G06F 11/1469* (2013.01)

(58) Field of Classification Search
CPC ............... G06F 11/1469; G06F 2201/815; G06F 11/1451; G06F 11/1484
USPC ................ 707/639, 649, 706, 707
IPC .............. G06F 11/1469, 2201/815, 11/1451
See application file for complete search history.

(56) References Cited

U.S. PATENT DOCUMENTS

| | | | |
|---|---|---|---|
| 7,356,679 B1* | 4/2008 | Le et al. | 713/1 |
| 7,809,692 B1* | 10/2010 | Pruthi et al. | 707/674 |
| 8,315,983 B1* | 11/2012 | Sumant et al. | 707/645 |
| 8,930,423 B1* | 1/2015 | Surampudi | H04L 67/06 380/259 |
| 2007/0185914 A1* | 8/2007 | Prahlad et al. | 707/200 |
| 2007/0294676 A1* | 12/2007 | Mellor et al. | 717/139 |
| 2008/0016387 A1* | 1/2008 | Bensinger | G06F 11/1456 714/4.11 |
| 2009/0313447 A1* | 12/2009 | Nguyen et al. | 711/162 |
| 2010/0070725 A1* | 3/2010 | Prahlad et al. | 711/162 |

* cited by examiner

*Primary Examiner* — James Trujillo
*Assistant Examiner* — Fatima Mina
(74) *Attorney, Agent, or Firm* — Morris & Kamlay LLP

(57) ABSTRACT

A system and method for managing backup and restore operations associated with a backup system. Metadata associated with files/directories of one or more file systems associated with one or more resources may be received. A virtual catalog image associated with the metadata may be created in a virtual file system image format. Once the virtual catalog image is created, virtualization vendor specific technology may be utilized to mount the image on the backup system and search and browse operations may be performed. The virtual catalog image may contain the file/directory hierarchy without containing actual file data.

20 Claims, 2 Drawing Sheets

SYSTEM AND METHOD OF STORING BACKUP IMAGE CATALOG

FIELD OF THE INVENTION

The invention relates to the field of backup and recovery systems. More particularly, the invention relates to creating, storing, and utilizing virtual images of a catalog for backup and recovery.

BACKGROUND OF THE INVENTION

Typically, a file server may contain a number of items, for example, files, directories, and/or other items associated with a file system and/or metadata associated with the items. When backing up the file server, a backup application may create a backup image that includes a backup of the items (i.e., backup of actual file data, etc.) onto a tape, disc, cloud, etc. The backup application may store the metadata associated with the items in a separate catalog file and/or in a database. This catalog file may then be utilized to perform search operations for particular files and directories without requiring a scan of the entire backup image. Based on the approach followed to store the metadata, the search capabilities may depend on the underlying database management system (for example, in the case where the metadata is stored in a database), or homegrown indexing capabilities of the underlying catalog file (for example, in the case where the metadata is stored in a catalog file). Both of these approaches may have limitations on file name length and path name length that they can support.

As the file server is periodically backed up, over time, a large amount of metadata records may be created and stored. Search performance of the database may degrade over time because a search through these records may need to be performed to, for example, restore a particular file.

Also, for backup systems in an enterprise that are configured to backup data associated with a number of machines associated with a number of users, it is important to ensure that a backup application allows a particular user to restore only files that he/she has access too. Typically, a backup application has to build its own security measures to restrict users from viewing files that are not owned by them.

Some backup applications may store the entire backup image in a virtual file system image format, for example, VMDK (virtual machine disk format) format supported by VMWare™, VHD (virtual hard disk) format supported by Microsoft®, and/or other virtual image formats, so that the whole image may be mounted for searching, browsing, and recovery purposes. The drawback of this approach, however, is that it requires a large amount of storage space because complete backup image copies must be stored at all recovery points in order to provide catalogs for these recovery points.

These and other drawbacks exist.

SUMMARY OF THE INVENTION

In some implementations, the invention relates to a system and method for managing backup and restore operations associated with a backup system. A backup system may comprise, among other things, at least one backup server that is configured to backup one or more items associated with one or more file systems. The one or more file systems may be associated with one or more managed resources that are to be backed up. The one or more managed resources may comprise computers, desktops, workstations, servers, file servers, and/or other hardware resources employed by one or more users in an enterprise.

The backup server may receive one or more records including actual data associated with one or more items, for example, files, directories, and/or other items, associated with a file system, and metadata associated with the items. The metadata may include, but not be limited to, names of files/directories, file/directory hierarchy, location of the files/directories in the backup image (for example, in terms of tape identifiers, tape location, location of files/directories in the tape, etc.), last modified date, last access date, creation date, user who created file/directory, owner of item, access permissions (read, write, etc.) associated with the items, users, and/or user groups, for example, in terms of access control lists and/or other security streams.

In some implementations, an image creating module may create a backup image of the actual data associated with the items. The image creating module may also create a catalog file associated with the received metadata records in a virtual file system image format. This created catalog file may be referred to as a virtual catalog image and may comprise a complete image of the file system encapsulated into a single file that is in the virtual file system image format. Therefore, the virtual catalog image may contain, for example, directory and file hierarchy information without containing the actual data associated with the items. As such, the virtual catalog image may include information about the location of a file or directory in the backup image. In some implementations, the virtual file system image format may be a VMDK (virtual machine disk format) format supported by VMWare™, a VHD (virtual hard disk) format supported by Microsoft™, and/or any other virtual image format supported by a given virtualization vendor without departing from the scope of this disclosure.

An image storing module may store the created backup image onto a tape, disk, cloud, or other medium. The image storing module may also store the virtual catalog image as a separate file in the backup server or in a database. In some implementations, the virtual catalog image may be stored in a tape, disk, cloud, or other medium.

In some implementations, a restoring/searching module may receive a restore/search request for a particular file(s). The restore/search request may include one or more search parameters, for example, one or more file/directory names/identifiers of files/directories to be restored/searched, user name/identifier associated with a user who created the request and/or a user whose file(s) are to be restored/searched, resource identifier, access permissions/security information, and/or other parameters. Based on the request, restoring/searching module may mount a virtual catalog image associated with a particular resource identified in the request using appropriate vendor specific technology. For example, if the virtual catalog image is in VMDK format, appropriate VMware tools may be used to mount the virtual catalog image on the backup server and use native file system search capabilities, and so on.

in some implementations, when the virtual catalog image is mounted on the backup server, the file system including the file/directory hierarchy associated with the particular resource can be accessed on the backup server. Various operations, for example, accessing, searching, restoring, and/or other operations may be performed based on and/or by the underlying file system. Because the virtual catalog image is a complete file system image, the file system may perform search operations for a particular file/directory identified in for example, the restore request. The underlying file system may also control a user's access to the file system based on the access permissions contained in the mounted catalog image.

In some implementations, the mounted virtual catalog image may be searched to identify the particular file in the file system or file/directory hierarchy. In some implementations, once the file is identified in the directory hierarchy, location of the identified file in the backup image of the items associated with the particular resource is determined. The mounted virtual catalog image may contain this location information. For example, the mounted virtual catalog image may include a tape identifier of the tape containing the backup image, a location of the tape containing the backup image, and location of the identified file in the tape. The identified file may be restored from the determined location in the backup image.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
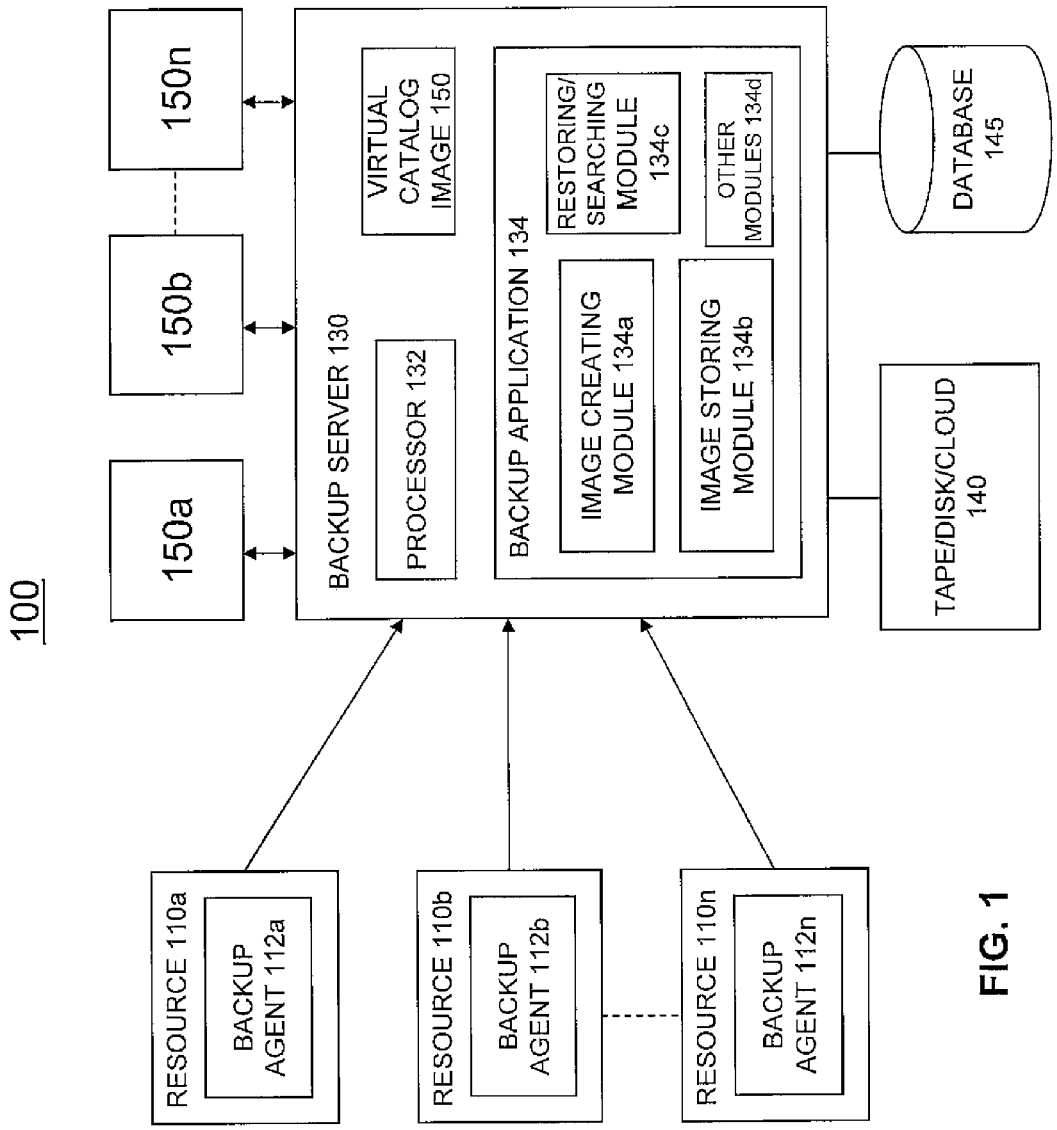
FIG. 1 is an illustration of an example backup system, according to various aspects of the invention.

FIG. 1 is an exemplary illustration of a backup system 100, according to various aspects of the invention. Backup system 100 may include, among other things, at least one backup server 130 that is configured to backup one or more items associated with one or more file systems. The one or more file systems may be associated with one or more managed resources 110a-110n that are to be backed up. The one or more managed resources 110a-110n may comprise computers, desktops, workstations, servers, file servers, and/or other hardware resources employed by one or more users in an enterprise. The backup server 130 may include one or more processors (e.g., a processor 132), circuitry, and/or other hardware operable to execute computer-readable instructions. According to one aspect of the invention, the backup system 100 may include one or more tangible computer-readable storage media configured to store one or more software modules, wherein the software modules include computer-readable instructions that when executed by one or more processors cause the processors to perform the functions described herein. According to one implementation, the backup server 130 may comprise computer hardware programmed with a backup computer application 134 having one or more software modules that enable the various features and functions of the invention. Non-limiting examples of the software modules in the application may include one or more of an image creating module 134a, an image storing module 134b, a restoring/searching module 134c, and/or other modules 134d for performing the features and functions described herein.

Backup server 130 may receive one or more records from managed resources 110a-110n, including actual data associated with one or more items (e.g., files, directories, and/or other items, associated with a file system) and metadata associated with the items. The metadata may include, for example, names of files/directories, file/directory hierarchy, location of the files/directories in the backup image, last modified date, last access date, creation date, user who created file/directory, owner of item, resource identifier, access permissions (read, write, etc.) associated with the items, users, and/or user groups, for example, in terms of access control lists and/or other security streams. Backup server 130 may periodically connect to the managed resources (at a predetermined backup time, for example) to request and/or receive the records for a backup procedure.

In some implementations, managed resources 110a-110n may run backup agents 112a-112n that gather the appropriate actual data and metadata information and send the gathered data to backup server 130 as requested. The metadata that is gathered may depend on the type of file system associated with the managed resources. While FIG. 1 depicts backup agents running on the resources 110a-110n, one of ordinary skill in the art would recognize that backup agents/tools may be run on the backup server, and in some cases be run in a distributed fashion on the resources and the backup server.

Administrators (or other users) may interact with backup server 130 via one or more client devices 150a-150n. Client devices 150a-150n may each include a user interface module (not shown) that may enable users to perform various operations that facilitate interaction with backup server 130 including, for example, configuring backup of data from the managed resources 110a-110n associated with one or more users, setting backup policies, providing restore/search requests for one or more items associated with one or more file systems, configuring mounting options, receiving requested information associated with items, and/or performing other operations. Client devices 150a-150n may include a processor (not shown), circuitry, and/or other hardware operable to execute computer-readable instructions. Backup policies may include policies regarding periodicity of backup (e.g., monthly, weekly, etc.), virtual file system image formats to be utilized for creating virtual catalog images for each managed resource, and/or other policies.

In some implementations, an image creating module 134a may receive records including actual data associated with one or more items to be backed up and metadata associated with the items. Image creating module 134a may create a backup image of the actual data associated with the items. The image creating module 134a may also create a catalog file associated with the received metadata records in a virtual file system image format. This created catalog file may be referred to as a virtual catalog image and may include a complete image of the file system encapsulated into a single file in virtual file system image format. Therefore, the virtual catalog image may contain, for example, directory and file hierarchy information without containing the actual data associated with the items to be backed up. As such, the virtual catalog image may include information about the location of a file or directory in the backup image of the actual data. In some implementations, the virtual file system image format may be a VMDK (virtual machine disk format) format supported by VMWare™, a VHD (virtual hard disk) format supported by Microsoft™, or may be in any other virtual image format supported by a given virtualization platform vendor without departing from the scope of this disclosure.

In some implementations, backup policies may indicate virtual file system image formats to be utilized for creating catalog images for each managed resource. For example, a backup policy may indicate that a VMDK format is to be utilized for creating catalog images for resource 110*a*, and so on. Image creating module 134*a* may accordingly create the virtual catalog image in a particular virtual file system image format based on the backup policies.

In some implementations, image creating module 134*a* may utilize one or more published application programming interfaces (APIs) of a given virtualization platform vendor, for example, VMWare™, Microsoft™, and/or other vendor, to create the virtual catalog image by utilizing knowledge about a given file system layout. For example, if the resource to be backed up is a NTFS (i.e., Windows NT™ file system) volume, image creating module 134*a* may use an API provided by the virtualization platform vendor to create an image catalog file in NTFS format. Accordingly, if the resource to be backed up is a FAT/EXT2 volume, then the image catalog file will be created in FAT/EXT2 format, and so on.

In some implementations, a virtual machine may be provided for each kind of operating system that the backup application 134 supports. The virtual machine may be provided on a separate server (e.g., a virtual machine hosting server—not shown), for example, VMware™ ESX server, Microsoft™ Hyper-V server, and/or other server. In some implementations, the virtual machine may have a catalog agent running therein. Image creating module 134*a* may send metadata records of items to be backed up to the catalog agent that stores the records in separate volumes using regular file system input/output (I/O) functions. This operation can be done either as part of the backup window or outside the backup window. For example, a backup server or other storage device may initially cache the metadata records in a temporary location during a backup procedure and send these metadata records to the catalog agent at the end of the backup procedure. In this manner, much of network bandwidth and other resources will be available to finish the backup procedure during a backup window. Because the catalog agent is running inside the virtual machine, it uses the metadata records to create a directory hierarchy using native file system "create directory" and "create file" interfaces. Any other metadata (e.g., the location of a file/directory on the backup image) may be stored as part of the data or extended attributes of the file/directory. This directory hierarchy created in the guest operating system automatically translates into a single virtual image file on the host operating system. This method will not require knowledge of the underlying file system's layout on the disk. These catalog files further can be transferred to the backup server for storage (e.g., on tape, disk, cloud, etc.). If possible, the backup server may mount these virtual image catalogs to perform search requests similar to implementation explained herein. If it cannot, then the backup server again relied on the catalog agent running inside the virtual machine of a given operating system to fulfill those requests. For example, if the backup server is a Windows™ server, it can mount the virtual image catalog files relating to Windows™ file systems. Image creating module 134*a* may receive the created virtual catalog image from the catalog agent.

An image storing module 134*b* may store the created backup image onto one or more tapes, disks, cloud, and/or other media 140. The image storing module 134*b* may store the virtual catalog images associated with managed resources 110*a*-110*n* as separate files 150 in backup server 130, in a database 145, and/or to tape/disk/cloud or other storage area. According to one aspect of the invention, backup server 130 may be communicatively coupled to the one or more tapes/disks 140 and database 145.

In some implementations, a restoring/searching module 134*c* may receive a restore/search request for a particular file(s), for example. The restore/search request may include one or more search parameters, for example, one or more file/directory names/identifiers of files/directories to be restored/searched, user name/identifier associated with a user who created the request and/or a user whose file(s) are to be restored/searched, resource identifier, access permissions/security information, and/or other parameters. Based on the request, restoring/searching module 134*c* may mount a virtual catalog image associated with a particular resource identified in the request using appropriate vendor specific technology. For example, if the virtual catalog image is in VMDK format, appropriate VMware tools may be used to mount the virtual catalog image on the backup server, use native file system search capabilities, and so on.

In some implementations, when the virtual catalog image is mounted on the backup server 130, the file system including the file/directory hierarchy associated with the particular resource can be accessed on the backup server 130. Various operations, for example, accessing, searching, restoring, and/or other operations may be performed based on and/or by the underlying file system. Because the virtual catalog image is a complete file system image, the file system may perform search operations for a particular file/directory identified in for example, the restore request.

In some implementations, the restore request may also specify a user whose files are to be restored. Accordingly, the underlying file system may perform search operations for a particular file/directory associated with the specific user. The underlying file system may control a user's access to the file system based on the access permissions contained in the mounted catalog image. As such, an access control mechanism need not be built into the backup system as the underlying file system is capable of performing access control operations.

In some implementations, the mounted virtual catalog image may be searched to identify the particular file in the file system or file/directory hierarchy. In some implementations, once the file is identified in the directory hierarchy, location of the identified file in the backup image of the items associated with the particular resource may be determined by restoring/searching module 134*c*. The mounted virtual catalog image may contain this location information. For example, the mounted virtual catalog image may include a tape identifier of the tape containing the backup image, a location of the tape containing the backup image, and location of the identified file in the tape. The identified file may be restored from the determined location in the backup image. For example, instead of scanning the entire backup image in the tape, a seek operation may be performed to the determined location and the actual file data may be accessed/restored from the determined location.

Figure 2:
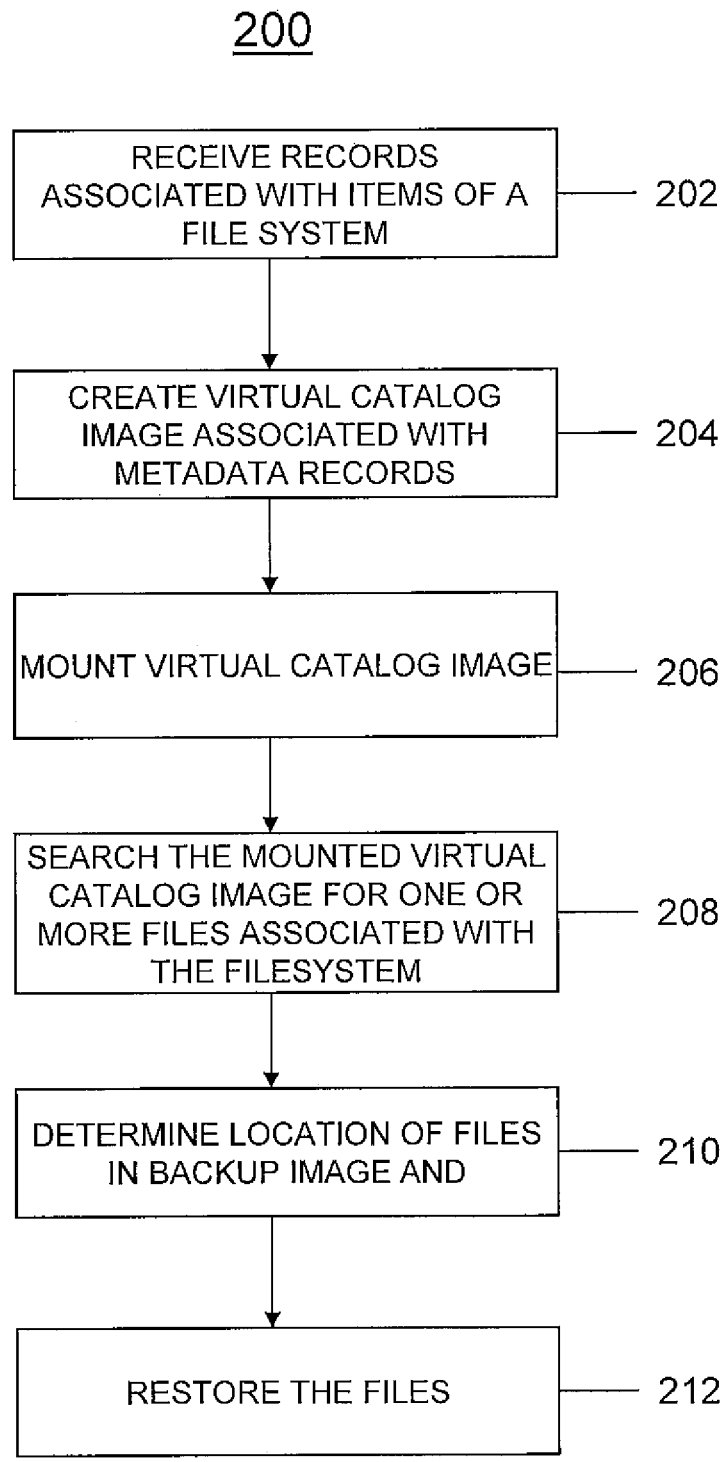
FIG. 2 is a flowchart depicting example operations performed by a backup system, according to various aspects of the invention.

FIG. 2 is an exemplary flowchart 200 depicting operations performed by a backup system, according to an aspect of the invention. The described operations may be accomplished using one or more of modules described herein and in some implementations, various operations may be performed in different sequences. In other implementations, additional operations may be performed along with some or all of the operations shown in FIG. 2. In yet other implementations, one or more operations may be performed simultaneously. In yet other implementations, one or more of operations may not be performed. Accordingly, the operations described are exemplary in nature and, as such, should not be viewed as limiting.

In an operation 202, one or more records including actual data and metadata associated with items of one or more file systems (associated with one or more managed resources 110a-110n) are received. In an operation 204, a backup image of the actual data associated with the items may be created and stored in tape(s)/disk(s)/cloud 140. A virtual catalog image associated with the received metadata records may be created and stored in a virtual file system image format, in operation 204. In an operation 206, the virtual catalog image may be mounted on the backup server.

In some implementations, a restore/search request may be received and the virtual catalog image may be mounted based at least in part on the request. For example, the request may include parameters, for example, managed resource identifiers identifying managed resources from which files are to be restored, users whose files are to be restored, file/directory names/identifiers of files to be restored, access permissions, and/or other parameters. Based on, for example, the resource identifiers in the restore request, a virtual catalog image created for an identified managed resource may be mounted on the backup server. One skilled in the art may recognize that virtual catalog image to be mounted may be determined based on other parameters solely or in combination with the resource identifiers.

In an operation 208, the mounted virtual catalog image may be searched to identify one or more files in the file system. In some implementations, a particular file/directory to be restored may be identified in the restore request, and the mounted virtual catalog image may be searched to identify the particular file/directory in the file/directory hierarchy. In an operation 210, the location of the identified file/directory in the backup image may be determined. In an operation 212, the identified file may be restored from the determined location in the backup image.

In some implementations, operations 206-212 may be performed in response to receipt of the restore/search request and/or for other reasons.

In some implementations, because the catalog file is stored in a virtual file system image format, and may be part of a specific vendor's virtualization platform, all high availability and error recovery features of the virtualization platform may be inherited. For example taking snapshots of these catalogs, if they are attached to a running virtual machine, then that virtual machine may be moved from one physical server to another physical server and so on, in case of resource crunch. As the virtual catalog image may be part of a virtual machine, Spanned, Striped, or RAID volumes may be created to store the image.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention, and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for managing backup and restoration of items, the method executed by a processor configured to perform a plurality of operations, the operations comprising:
   receiving, by a backup server, one or more records associated with items of a local file system of a managed resource, the one or more records comprising an actual data records portion and a metadata records portion;
   creating, by the backup server, a backup image associated with the actual data records portion, wherein the backup image does not comprise the metadata records portion;
   sending, by the backup server, to a remote server provided by a storage services provider, the created backup image;
   providing, by the backup server, to a virtual machine hosting server distinct from the remote server, the metadata records portion which allows the virtual machine hosting server to create a virtual catalog image comprising the metadata records portion, wherein the virtual catalog image is in a virtual file system image format, and wherein the virtual catalog image does not comprise the actual data records portion;
   receiving, at the backup server, from the virtual machine hosting server, the created virtual catalog image;
   receiving, at the backup server, a restore request associated with the items, the restore request comprising a parameter;
   mounting, on the backup server, the received virtual catalog image based on the parameter of the restore request; and
   performing, by the backup server, a search operation on the mounted virtual catalog image to identify one or more of the items to be restored.

2. The computer-implemented method of claim 1, wherein the virtual file system image format comprises VMDK format or a VHD format.

3. The computer-implemented method of claim 1, wherein the one or more records are received from a backup agent running on the managed resource.

4. The computer-implemented method of claim 1, wherein creating a virtual catalog image further comprises utilizing an application programming interface of virtualization platform vendor to create the virtual catalog image.

5. The computer-implemented method of claim 1, wherein the parameter of the restore request comprises an identifier of the managed resource from which the items are to be restored, and identifiers of the items that are to be restored, the operations further comprising:
   in response to the restore request;
   mounting the received virtual catalog image associated with the managed resource identified in the restore request;
   performing the search operation on the mounted virtual catalog image to identify the items identified in the restore request;

determining a location of the identified items in the backup image; and restoring, to the local file system of the managed resource, the identified items from the determined location in the backup image.

6. The computer-implemented method of claim 1, wherein the plurality of operations further comprise providing, on the virtual machine hosting server, a catalog agent that runs on a virtual machine of an operating system, and wherein creating a virtual catalog image comprising the metadata records portion further comprises the catalog agent creating the virtual catalog image using interfaces native to the operating system.

7. A non-transitory computer-readable storage medium having computer-readable instructions thereon which when executed by a processor cause the processor to;

receive, at a backup server, one or more records associated with items of a local file system of a managed resource, the one or more records comprising an actual data records portion and a metadata records portion;

create, by the backup server, a backup image associated with the actual data records portion, wherein the backup image does not comprise the metadata records portion;

send, by the backup server to a remote server provided by a storage services provider, the created backup image;

provide, by the backup server, to a virtual machine hosting server distinct from the remote server, the metadata records portion which allows the virtual machine hosting server to create a virtual catalog image comprising the metadata records portion, wherein the virtual catalog image is in a virtual file system image format, and wherein the virtual catalog image does not comprise the actual data records portion;

receive, by the backup server, from the virtual machine hosting server, the created virtual catalog image;

receive, by the backup server a restore request associated with the items, the restore request comprising a parameter; mount, on the backup server, the received virtual catalog image based on the parameter of the restore request; and perform, by the backup server, a search operation on the mounted virtual catalog image to identify one or more of the items to be restored.

8. The tangible computer-readable storage medium of claim 7, wherein the virtual file system image format comprises VMDK format or a VHD format.

9. The tangible computer-readable storage medium of claim 7, wherein the one or more records are received from a backup agent running on the managed resource.

10. The tangible computer-readable storage medium of claim 7, the instructions further cause the processor to:

create the virtual catalog image by utilizing an application programming interface of virtualization platform vendor.

11. The tangible computer-readable storage medium of claim 7, wherein the parameter of the restore request comprises an identifier of the managed resource from which the items are to be restored, and identifiers of the items that are to be restored, and the instructions further cause the processor to:

in response to the restore request:

mount the received virtual catalog image associated with the managed resource identified in the restore request;

perform the search operation on the mounted virtual catalog image to identify the items identified in the restore request;

determine a location of the identified items in the backup image; and restore, to the local file system of the managed resource, the identified items from the determined location in the backup image.

12. The tangible computer-readable storage medium of claim 7, the instructions further cause the processor to provide, on the virtual machine hosting server, a catalog agent that runs on a virtual machine of an operating system, and wherein creating a virtual catalog image comprising the metadata records portion further comprises the catalog agent creating the virtual catalog image using interfaces native to the operating system.

13. A computer-implemented system for managing backup and restore of items, the system comprising:

a backup server including a processor, the processor configured to:

receive one or more records associated with items of a local file system of a managed resource, the one or more records comprising an actual data records portion and a metadata records portion;

create a backup image associated with the actual data records portion, wherein the backup image does not comprise the metadata records portion;

send, to a remote server provided by a storage services provider, the created backup image;

provide, to a virtual machine hosting server distinct from the remote server, the metadata records portion which allows the virtual machine hosting server to create a virtual catalog image comprising the metadata records portion, wherein the virtual catalog image is in a virtual file system image format, and wherein the virtual catalog image does not comprise the actual data records portion;

receive, from the virtual machine hosting server, the created virtual catalog image;

receive a restore request associated with the items, the restore request comprising a parameter;

mount the received virtual catalog image based on the parameter of the restore request; and perform a search operation on the mounted virtual catalog image to identify one or more of the items to be restored.

14. The computer-implemented system of claim 13, wherein the virtual file system image format comprises VMDK format or a VHD format.

15. The computer-implemented system of claim 13, wherein the one or more records are received from a backup agent running on the managed resource.

16. The computer-implemented system of claim 13, wherein the processor is further configured to:

create the virtual catalog image by utilizing an application programming interface of virtualization platform vendor.

17. The computer-implemented system of claim 13, wherein the parameter of the restore request comprises an identifier of the managed resource from which the items are to be restored, and identifiers of the items that are to be restored, and the processor is further configured to:

in response to the request:

mount the received virtual catalog image associated with the managed resource identified in the restore request;

perform the search operation on the mounted virtual catalog image to identify the items identified in the restore request;

determine a location of the identified items in the backup image; and restore, to the local file system of the managed resource, the identified items from the determined location in the backup image.

18. The computer-implemented system of claim 13, the processor being further configured to provide, on the virtual machine hosting server, a catalog agent that runs on a virtual machine of an operating system, and wherein creating a virtual catalog image comprising the metadata records portion further comprises the catalog agent creating the virtual catalog image using interfaces native to the operating system.

19. The computer-implemented method of claim 6, wherein the backup image is in a file format of the file system associated with the managed resource and the virtual catalog image is in a virtual file system image format corresponding to the virtual machine.

20. The computer-implemented method of claim 1, further comprising dividing the received one or more records into the actual data records portion and the metadata records portion.

* * * * *